US012601215B2

(12) United States Patent
Buttolo et al.

(10) Patent No.: US 12,601,215 B2
(45) Date of Patent: Apr. 14, 2026

(54) VEHICLE CLOSURE RELEASE METHOD AND RELEASE SYSTEM

(71) Applicant: Ford Global Technologies, LLC, Dearborn, MI (US)

(72) Inventors: Pietro Buttolo, Dearborn Heights, MI (US); John Eric Rolinger, Troy, MI (US); Christopher Henderson, Belleville, MI (US); Scott Steadmon Thompson, Belleville, MI (US); Matthew Ryan Preston, Whitmore Lake, MI (US); Robert Michael Grant, Farmington Hills, MI (US); Brendan Smythe, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 18/181,012

(22) Filed: Mar. 9, 2023

(65) Prior Publication Data

US 2024/0301743 A1 Sep. 12, 2024

(51) Int. Cl.
*E05F 15/73* (2015.01)
*E05F 15/75* (2015.01)

(52) U.S. Cl.
CPC .............. *E05F 15/75* (2015.01); *E05F 15/73* (2015.01); *E05Y 2900/546* (2013.01)

(58) Field of Classification Search
CPC ............ E05F 15/75; E05F 15/73; E05F 15/70
See application file for complete search history.

(56) References Cited

U.S. PATENT DOCUMENTS

| | | | | |
|---|---|---|---|---|
| 6,264,267 | B1 | 7/2001 | Glanton et al. | |
| 6,435,600 | B1 * | 8/2002 | Long | E05F 15/632 49/360 |
| 6,695,394 | B2 | 2/2004 | Takahashi | |
| 10,107,025 | B2 * | 10/2018 | Koda | B60R 25/2045 |
| 10,745,959 | B2 * | 8/2020 | Iino | G01D 5/165 |
| 10,774,571 | B2 | 9/2020 | Zeabari et al. | |
| 10,815,716 | B2 * | 10/2020 | Okuma | B60J 10/246 |
| 10,822,842 | B2 * | 11/2020 | Salter | G01H 1/12 |
| 10,914,112 | B2 * | 2/2021 | Ghannam | E05F 15/73 |
| 11,475,889 | B2 * | 10/2022 | Grgac | E05F 15/76 |
| 11,781,369 | B2 * | 10/2023 | Salter | E05F 15/75 49/31 |
| 2002/0089204 | A1 | 7/2002 | Fisher et al. | |
| 2004/0124662 | A1 | 7/2004 | Cleland et al. | |
| 2020/0392779 | A1 * | 12/2020 | Zhu | B60R 5/041 |
| 2022/0290484 | A1 * | 9/2022 | Salter | B60J 5/047 |
| 2023/0356694 | A1 * | 11/2023 | Paradis | B60R 25/305 |

FOREIGN PATENT DOCUMENTS

| | | | |
|---|---|---|---|
| DE | 102019104656 | A1 | 8/2020 |
| DE | 102020121215 | A1 | 3/2021 |

* cited by examiner

*Primary Examiner* — Muhammad Ijaz
*Assistant Examiner* — Susan M. Heschel
(74) *Attorney, Agent, or Firm* — Vichit Chea; Carlson, Gaskey & Olds, P.C.

(57) ABSTRACT

A closure release method includes monitoring a pressure between a closure of a vehicle and a frame of the vehicle when the closure is closed against the frame. The method further includes detecting a change in the pressure, and releasing the closure from a closed position in response to the change.

18 Claims, 4 Drawing Sheets

VEHICLE CLOSURE RELEASE METHOD AND RELEASE SYSTEM

TECHNICAL FIELD

This disclosure relates generally to releasing a vehicle closure assembly from a locked position in response to a user pressing against the closure assembly.

BACKGROUND

Vehicles can include various closure assemblies, such as side doors and liftgates. Closure assemblies of the vehicles can pivot back-and-forth relative to a vehicle body between a closed position and a fully open position. Latches can latch the closure assemblies in closed positions to prevent pivoting the closure assemblies to the fully open position.

SUMMARY

In some aspects, the techniques described herein relate to a closure release method, including: monitoring a pressure between a closure of a vehicle and a frame of the vehicle when the closure is closed against the frame; detecting a change in the pressure; and releasing the closure from a closed position in response to the change.

In some aspects, the techniques described herein relate to a closure release method, further including releasing the closure additionally in response to a detection of a user.

In some aspects, the techniques described herein relate to a closure release method, further including monitoring the pressure using at least one force-sensing resistor.

In some aspects, the techniques described herein relate to a closure release method, wherein the closure is a liftgate.

In some aspects, the techniques described herein relate to a closure release method, further including monitoring the pressure at a first position on a driver side of the liftgate and at a second, different position on a passenger side of the liftgate.

In some aspects, the techniques described herein relate to a closure release method, further including uncinching the liftgate prior to the releasing.

In some aspects, the techniques described herein relate to a closure release method, further including uncinching the liftgate in response to detecting an authorized user.

In some aspects, the techniques described herein relate to a closure release method, further including detecting the authorized user based on detecting a keyfob.

In some aspects, the techniques described herein relate to a closure release method, wherein the releasing including unlatching the closure without pivoting the closure from the frame.

In some aspects, the techniques described herein relate to a closure release method, further including, automatically moving the closure to an open position after the releasing.

In some aspects, the techniques described herein relate to a closure release method, wherein the detecting includes detecting an increase in pressure.

In some aspects, the techniques described herein relate to a closure release method, wherein the detecting includes detecting an increase in pressure for a time period.

In some aspects, the techniques described herein relate to a vehicle closure release system, including: a closure pivotably coupled to a vehicle frame; a pressure monitoring assembly that detects a pressure between the closure and the vehicle frame when the closure is closed; and a control module configured to release the closure based at least in part on the pressure between the closure and the vehicle frame.

In some aspects, the techniques described herein relate to a vehicle closure release system, wherein the control module is configured to release the closure additionally based on a detection of a user.

In some aspects, the techniques described herein relate to a vehicle closure release system, wherein the pressure monitoring assembly includes at least one force-sensing resistor.

In some aspects, the techniques described herein relate to a vehicle closure release system, wherein the closure is a liftgate.

In some aspects, the techniques described herein relate to a vehicle closure release system, wherein the control module is configured to release the closure by commanding an unlatching of the closure without pivoting the closure from the frame.

In some aspects, the techniques described herein relate to a vehicle closure release system, wherein the control module is configured to release the closure by commanding an unlatching of the closure and a pivoting of the closure from the frame.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary vehicle closures, such as liftgates, that release from a closed position in response to a user pushing on an exterior surface. The vehicle closures can be considered push-to-open or push-to-release vehicle closures.

Figure 1:
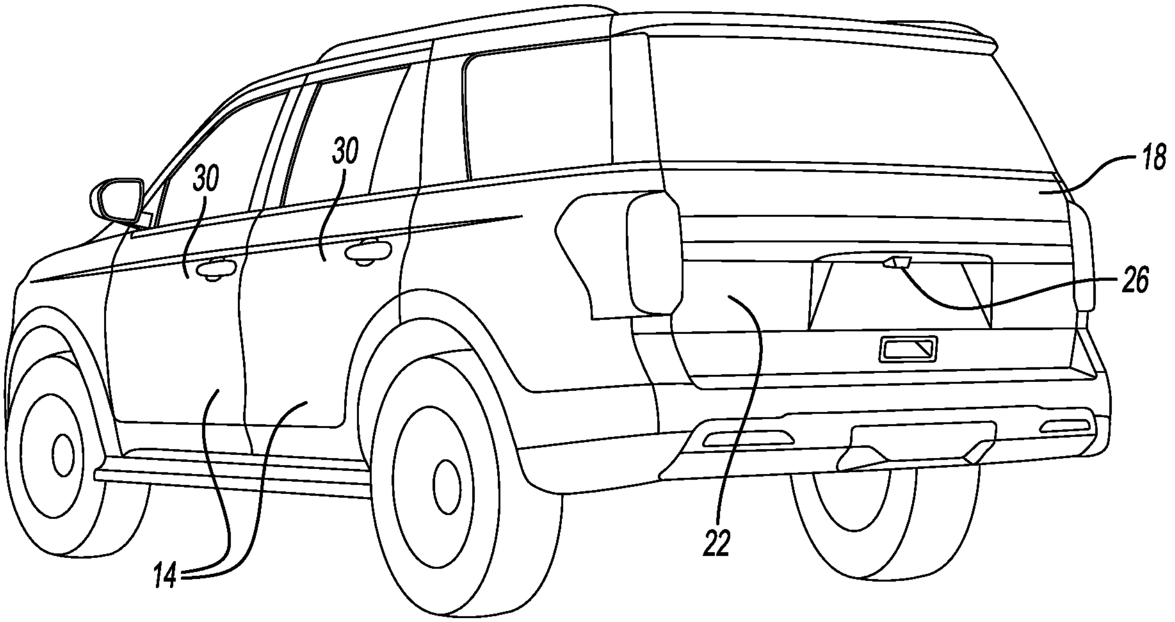
FIG. 1 illustrates a rear perspective view of a vehicle having a liftgate in a closed position according to an exemplary aspect of the present disclosure.
Figure 2:
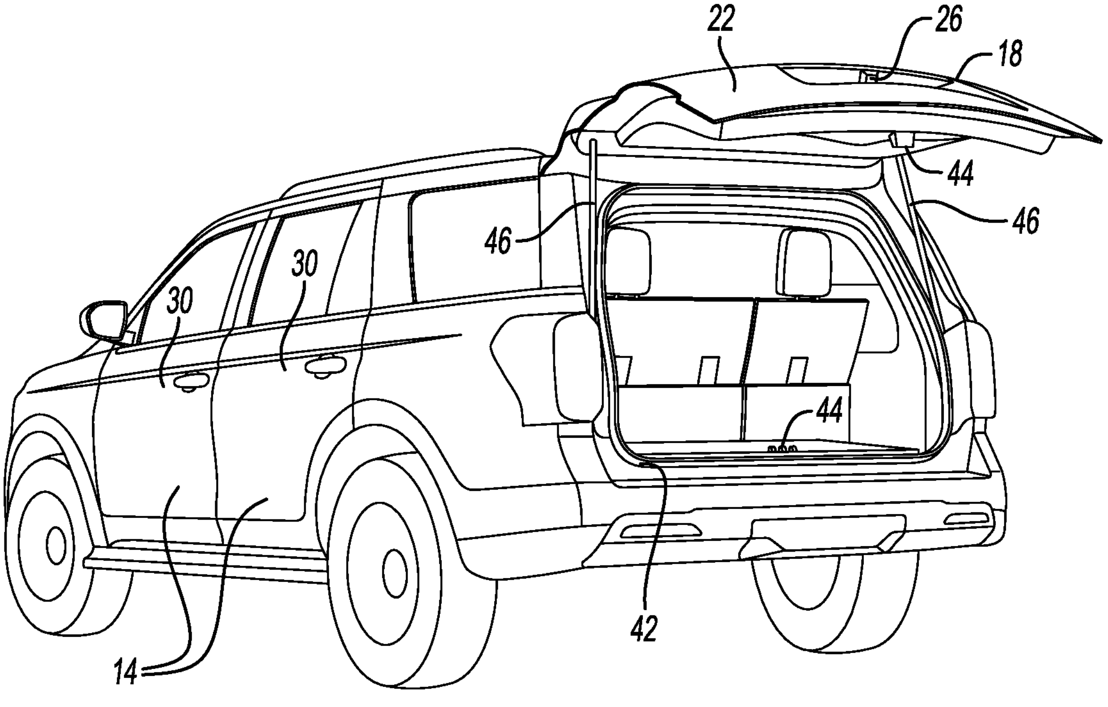
FIG. 2 illustrates the rear perspective view of FIG. 1 with the liftgate in a fully open position.

With reference to FIGS. 1 and 2, a vehicle 10 according to an exemplary aspect of the present disclosure includes various closures, such as side doors 14 and a liftgate 18. The closures can each pivot back-and-forth between a closed position and a fully-open position. The closures can be latched when in a closed position. The closures can be considered open when unlatched. The closures can be considered fully-open when unlatched and pivoted to provide an access opening to a passenger compartment of the vehicle.

The liftgate 18 in FIG. 1 is latched in a closed position. In FIG. 2, the liftgate 18 has been unlatched and pivoted to a fully-open position.

The liftgate 18 has an outer surface 22. In this example, the vehicle 10 includes a closure release system that enables a user pressing on the outer surface 22 to release the liftgate 18 from the closed position. When released from the closed position, the liftgate 18 can be moved from the closed position of FIG. 1 to the fully-open position of FIG. 2.

To initiate the release, the user can press on outer surface 22 using, for example, their hand. While the user could also actuate a liftgate handle 26 to open the liftgate 18, actuating the liftgate handle 26 is not required.

Although the closure release system is described in connection with the liftgate 18, other closures of the vehicle 10, such as the side doors 14, could include the closure release system enabling the release of the side doors 14 in response to a user pressing on an outer surface 30 of the side doors 14.

Figure 3:
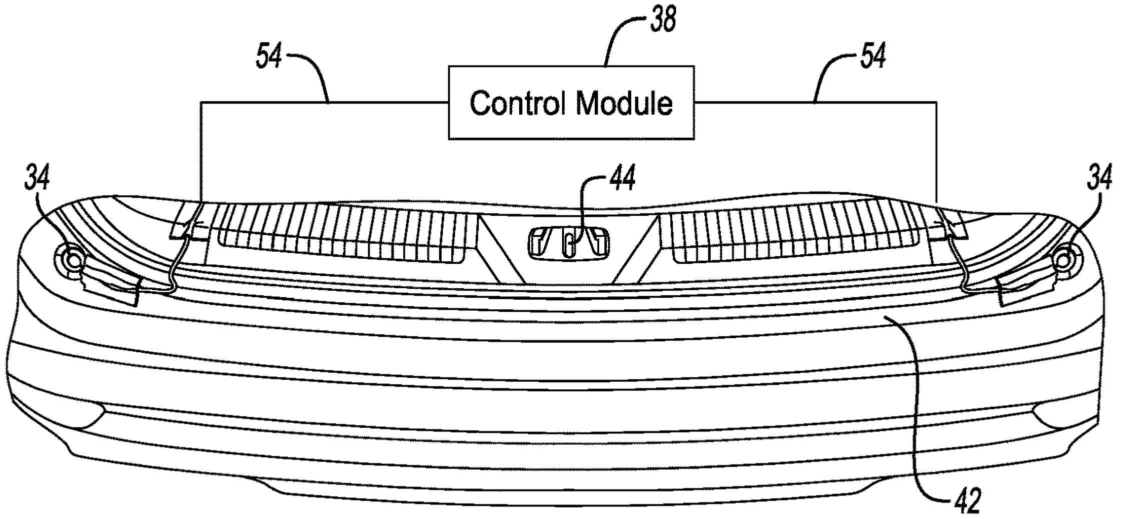
FIG. 3 illustrates a close-up of a liftgate sill area from FIG. 2.

With reference now to FIG. 3 and continued reference to FIGS. 1 and 2, to detect a press on the outer surface 22 of the liftgate 18, the closure release system includes, in this example, a pair of pressure monitoring assemblies 34 and a control module 38. The pressure monitoring assemblies 34, in this example, detect a pressure between the liftgate 18 and a vehicle frame 42. The control module 38 is configured to release the liftgate 18 based at least in part on the pressure between the liftgate 18 and the vehicle frame 42.

The control module 38 may include both hardware and software and could be part of an overall vehicle control system, such as a vehicle system controller (VSC), or could alternatively be a stand-alone controller separate from the VSC. In an embodiment, the control module 38 is programmed with executable instructions for interfacing with and commanding operation of various components of the system. The control module 38 may include a processor and non-transitory memory for executing various control strategies and modes. The processor can be a custom made or commercially available processor, a central processing unit (CPU), or generally any device for executing software instructions. The memory can include any one or combination of volatile memory elements and/or nonvolatile memory elements.

The liftgate 18 being released means, for purposes of this disclosure, that the liftgate 18 is free to pivot from the closed position of FIG. 1 to the fully-open position of FIG. 2. Releasing can include unlatching the liftgate 18 from the vehicle frame 42. In this example, the control module 38 releases the liftgate 18 from the closed position by commanding an unlatching of a latch assembly 44 that, when latched, holds the liftgate 18 in the closed position Once released, the liftgate 18 can be pivoted to the fully-open position by a user manually moving the liftgate 18 to the open position. The manual pivoting could be assisted with at least one lift assist 46. In some examples, the liftgate 18 could instead or additionally be pivoted to the fully-open position via a powered pivot system. In such a system, an actuator could drive the lift assists 46 to pivot the liftgate 18.

The example pressure monitoring assemblies 34 are force-sensing resistors. One of the pressure monitoring assemblies 34 is disposed at a first position on the driver side of a rear sill 50 of the vehicle 10. The other pressure monitoring assembly 34 is disposed at a second position on the passenger side of the rear sill 50, which is attached to the vehicle frame 42. In other examples, the pressure monitoring assemblies 34 could instead or additionally be mounted on the closure—here the liftgate 18.

In this example, the pressure monitoring assemblies 34 are disposed within depressions in the rear sill 50. These depressions receive plungers mounted on the underside of the liftgate 18 when the liftgate 18 is closed.

The force-sensing resistors that provide the pressure monitoring assemblies 34 consist of a conductive polymer film, which changes resistance in a predictable manner following application of force to a surface of the film. Applying a force to the surface causes particles within the conductive polymer film to touch conducting electrodes, which changes the resistance of the conductive polymer film.

The pressure monitoring assemblies 34 are operably coupled to the control module 38 via a power line 54, such as a five or twelve Volt power line, and then in series to a resistor of within the control module 38. An analog-to-digital converter (ADC) of the control module 38 can be used to sample the voltage across the resistor.

When the liftgate 18 is not applying pressure measured by the pressure monitoring assemblies 34, the example pressure monitoring assemblies 34 act as an open circuit where no current flows across the resistor and zero voltage is read by the ADC. As pressure is applied when the liftgate 18 is closed, the resistance on the force-sensing resistors providing the example pressure monitoring assemblies 34 starts decreasing, more or less linearly, reaching zero at particular load, such as a load that is from 50 to 100 Newtons.

Instead or in place of the force-sensing resistors, the pressure monitoring assemblies 34 could comprise strain-gages, load cells, smart materials that detect pressure changes based on variable resistance or variable capacitance, or some other pressure sensing component.

Figure 4:
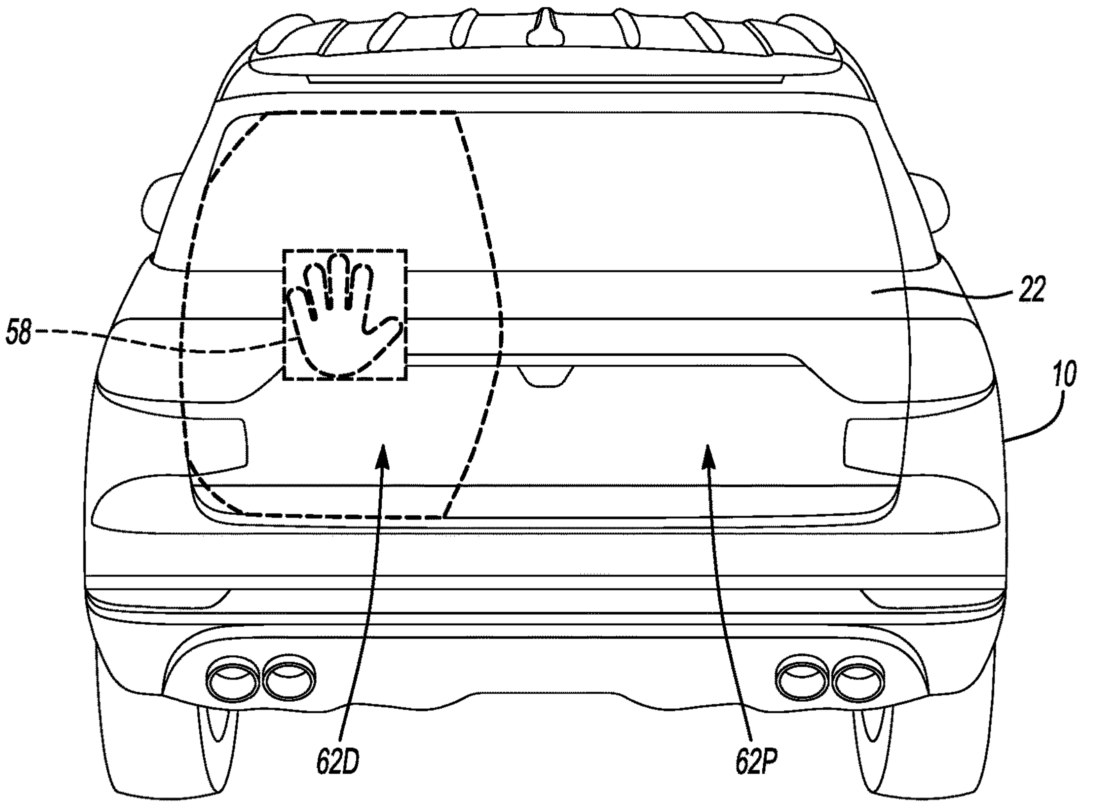
FIG. 4 illustrates a rear view of the vehicle of FIGS. 1 and 2 with the liftgate in the closed position.

The pressure monitoring assembly 34 on the driver side can be used to detect a pressure change associated with a user 58 pressing on a driver side 62D of the liftgate 18, as shown in FIG. 4. Correspondingly, the pressure monitoring assembly 34 on the passenger side can detect a pressure change associated with the user 58 pressing their hand on a passenger side 62P of the liftgate 18. With this arrangement, the pressure monitoring system can detect pressure changes resulting from a user pressing substantially anywhere on the outer surface 30.

In other examples, the pressure monitoring system is configured to only detect the user 58 pressing on some areas of the outer surface 30, but not other areas. For example, the pressure monitoring system could include one or more force-sensing resistors only on the driver side 62D of the vehicle 10. This approach can reduce complexity, but the user 58 can initiate a release of the liftgate 18 by pressing on the driver side 62D rather than pushing on any area of the outer surface 30 of the liftgate 18. In such an example, a pressure change associated with a press on the driver side 62D, but not a pressure change associated with a press on the passenger side 62P.

In some examples, the pressure monitoring system can additionally be used to detect when the liftgate 18 is in a closed position. This can reduce the number of control modules required within the vehicle 10.

The pressure change detected by the pressure monitoring system triggers, in this example, the releasing of the liftgate 18 by the control module 38 if an authorized user is detected near the vehicle 10. That is, the user 58 must be an authorized user to have the pressure change brought about by the user 58 triggering a release of the liftgate 18. As can be appreciated, this can help to prevent unauthorized users from releasing the liftgate 18 by pressing on the outer surface 22 of the liftgate 18.

In this example, the liftgate 18 is automatically "cinched" in a closed position of FIG. 1. The automatic cinching draws the liftgate 18 toward the vehicle frame 42 to compress seals and fully close the liftgate 18. Uncinching the liftgate 18 can be required to transition the liftgate 18 to a fully open position.

The liftgate 18 being cinched may make detecting a pressure change resulting from the user 58 pressing against the liftgate 18 more difficult. Thus, in this example, the liftgate 18 automatically uncinches when the authorized user is detected near the vehicle 10 even before that authorized user presses on the outer surface 22. Once the liftgate 18 is uncinched, the example pressure monitoring sensor can then more easily detect pressure changes.

While the example liftgate 18 is uncinched when the user is proximate the vehicle, uncinching is not required. In some examples, the pressure monitoring system can more effectively detect pressure changes when the liftgate 18 is cinched.

Detecting the authorized user may be based on detecting a keyfob within a certain range of the vehicle 10. A person having skill in this art and the benefit of this disclosure would understand how to detect an authorized user within a particular range of the vehicle 10.

Figure 5:
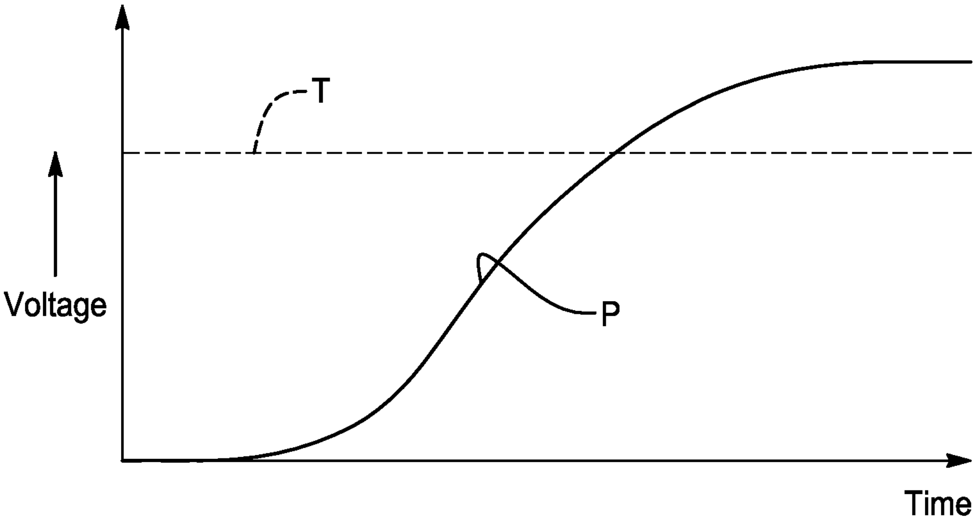
FIG. 5 illustrates a graph of a voltage signal over time tracked by a pressure monitoring system according to an exemplary embodiment.

The pressure change that triggers the release of the liftgate 18 could have many forms. FIG. 5 shows an example graph of pressure P detected by the pressure monitoring system of FIG. 3 over time. When the pressure P changes such that the pressure P is increased above a threshold pressure level T, the control module 38 commands a release of the liftgate 18. The pressure P increase above the threshold pressure level T is interpreted as resulting from the user 58 pressing on the outer surface 22.

Figure 6:
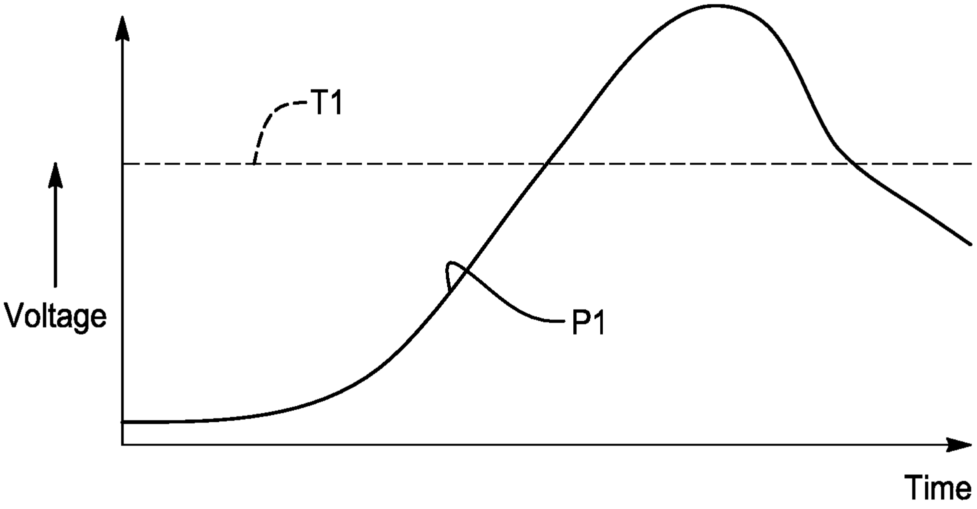
FIG. 6 illustrates a graph of a voltage signal over time tracked by a pressure monitoring system according to another exemplary embodiment.

In another example, the pressure change that leads to releasing the closure is a pressure change that exceeds a threshold value by a certain amount for a certain time, and then drops back below the threshold value. A graphical example of this "pulse" in the pressure signal is shown in FIG. 6. As shown, the pressure P1 increases above a threshold pressure level T1 and then drops below the threshold pressure level T1. Using the pulse-style pressure change of FIG. 6 to trigger releasing the liftgate 18 rather than the pressure P of FIG. 5 exceeding the threshold T can help to distinguish the user 58 pressing on the liftgate 18 for the purpose of triggering the liftgate 18 to open from pressure resulting from the user 58 pressing on liftgate 18 by simply leaning their body against the liftgate 18.

In some examples, after pushing the liftgate 18 from an initial position due the user leaning on the liftgate 18, the liftgate 18 might not return to the initial position, but instead to a position resulting in a higher pressure reading from the pressure monitoring system. The signal resulting from this situation can rise above the threshold, but then does not drop back below the threshold due to mechanical hysteresis, for example. To make sure that this is recognized as a pulse triggering the release of the liftgate 18, the control module 38 can, in some examples, track a maximum value associated with the pressure monitoring system. The control module 38 can use that maximum value (minus a delta) to set an adaptable threshold.

Figure 7:
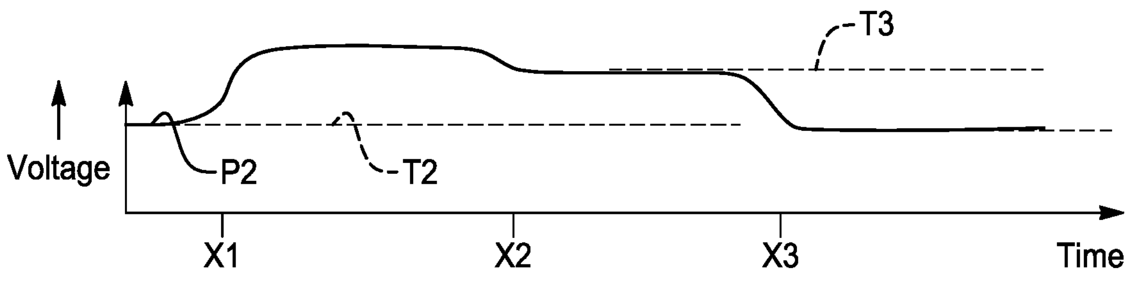
FIG. 7 illustrates a graph of a voltage signal over time tracked by a pressure monitoring system according to yet another exemplary embodiment.

As explained in connection with FIG. 7, the pressure P2 exceeds an initial threshold T2 starting at time X1 due to the user leaning on the liftgate 18. At time X2, the user changes their posture, but is still leaning on the liftgate 18. A subsequent threshold T3 is established as a baseline. Pulses rising above the subsequent threshold T3 can then be interpreted as triggering the release of the liftgate 18. At time X3, the user moves away from the liftgate 18 and the pressure P2 correspondingly drops.

The threshold above which a pulse prompting the release of the liftgate 18 could also be adjusted when the user 58 leans on the liftgate 18 for longer than a standard pulse time. As the signal is increased longer than what is recognized as a pulse, the control module 38 does not command the liftgate 18 to open.

In the example pressure monitoring system where two force sensing resistors are used as the pressure monitoring assemblies 34, the user 58 can press directly on one of the force sensing resistors to trigger a pivoting of the liftgate 18 from the fully-open position of FIG. 2 to the closed position of FIG. 1. The user 58 would be able to access the one of the force sensing resistors when the liftgate 18 is in an open position as the rear sill 50 is accessible to the user 58. Because the pressure monitoring system includes two force sensing resistors and only one will register a pressure, the voltage signal resulting from the user pressing on that force sensing resistors would be readily distinguishable from a signal change resulting from a pressure increase when the liftgate 18 is closing as that would lead to a signal change from both force sensing resistors.

The pressure monitoring assemblies 34 can continually monitor pressures from the force sensing resistors. Some noise may be present in the signals sent from the force sensing resistors to the control module 38.

Based on the pressures detected by the force sensing resistors, the pressure monitoring assemblies 34 can assess, among other things, whether the liftgate 18 is in a closed state, a fully opened state, a closing state, or an opening state.

If a signal from both force sensing resistors is less than a max noise threshold, the control module can assign the state as OPEN. If signal from both force sensing resistors is more than a noise threshold, the state is considered a CLOSED state. The value read by the force sensing resistors providing the pressure monitoring assemblies 34 can then be set as the new liftgate-closed threshold, i.e. the threshold that needs to be exceeded to determine that the user 58 is pushing on the liftgate 18. Note that the two force sensing resistors could have different thresholds, depending on how the two plungers, for example, are tuned.

In this example, the thresholds are recalculated every time the liftgate 18 closes from the fully open state, The control module 38 will determine that the liftgate 18 is closing because both force sensing resistors start recording values larger than max noise levels. If both force sensing resistors persist in exceeding such level, the new values can set as the new threshold. To trigger the setting of the new threshold, the new values may need to be occur after a pre-defined period, which can be just enough for cinching to complete (200 ms, for example.)

Figure 8:
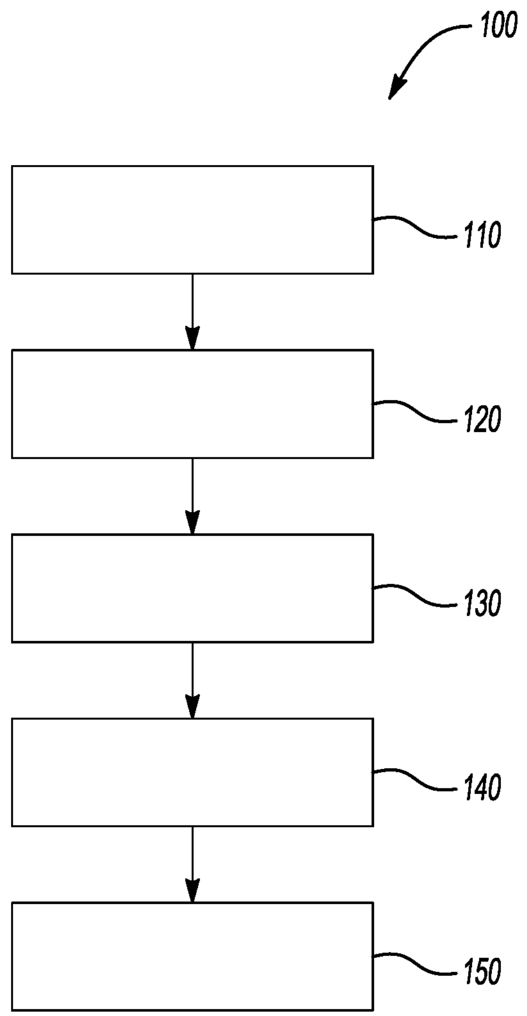
FIG. 8 illustrates a flow of an example closure release method.

With reference to FIG. 8, an example closure release method 100 begins at a step 110 where a passive-keyless-entry system (keyfob phone-as-a-key) detects the presence of an authorized user and authenticates that detection.

Next, at a step 120, a request is sent through a control module of a vehicle, such as a body control module (BCM), to a liftgate control module and eventually to the cinch-module, which, in response, uncinches the liftgate.

At a step 130, the user presses on the liftgate. This induces a signal on a pressure sensor, which generates an activation trigger signal that is sent to the BCM.

The BCM processes the request at a step 140 and, if authorized (vehicle in park, not moving, keyfob present, etc.), will forward it to the liftgate module.

Next, at a step 150, the liftgate module will command the liftgate to open.

Notably, if the keyfob leaves the area around the vehicle, after a short delay the BCM can command the gate to cinch.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A closure release method, comprising:

monitoring a pressure between a closure of a vehicle and a frame of the vehicle when the closure is closed against the frame;

detecting a change in the pressure; and releasing the closure from a closed position in response to the change.

2. The closure release method of claim 1, further comprising releasing the closure additionally in response to a detection of a user.

3. The closure release method of claim 1, further comprising monitoring the pressure using at least one force-sensing resistor.

4. The closure release method of claim 1, wherein the closure is a liftgate.

5. The closure release method of claim 4, further comprising monitoring the pressure at a first position on a driver side of the liftgate and at a second, different position on a passenger side of the liftgate.

6. The closure release method of claim 4, further comprising uncinching the liftgate prior to the releasing.

7. The closure release method of claim 6, further comprising uncinching the liftgate in response to detecting an authorized user.

8. The closure release method of claim 7, further comprising detecting the authorized user based on detecting a keyfob.

9. The closure release method of claim 1, wherein the releasing comprises unlatching the closure without pivoting the closure from the frame.

10. The closure release method of claim 1, further comprising, automatically moving the closure to an open position after the releasing.

11. The closure release method of claim 1, wherein the detecting includes detecting an increase in pressure.

12. The closure release method of claim 1, wherein the detecting includes detecting an increase in pressure for a time period.

13. A vehicle closure release system, comprising:

a closure pivotably coupled to a vehicle frame;

a pressure monitoring assembly that detects a pressure between the closure and the vehicle frame when the closure is closed; and a control module configured to release the closure based at least in part on the pressure between the closure and the vehicle frame.

14. The vehicle closure release system of claim 13, wherein the control module is configured to release the closure additionally based on a detection of a user.

15. The vehicle closure release system of claim 13, wherein the pressure monitoring assembly includes at least one force-sensing resistor.

16. The vehicle closure release system of claim 13, wherein the closure is a liftgate.

17. The vehicle closure release system of claim 13, wherein the control module is configured to release the closure by commanding an unlatching of the closure without pivoting the closure from the frame.

18. The vehicle closure release system of claim 13, wherein the control module is configured to release the closure by commanding an unlatching of the closure and a pivoting of the closure from the frame.

* * * * *